Aug. 1, 1933.           C. A. ODEGARD           1,920,878
HITCHING DEVICE FOR TRACTORS
Filed July 30, 1932
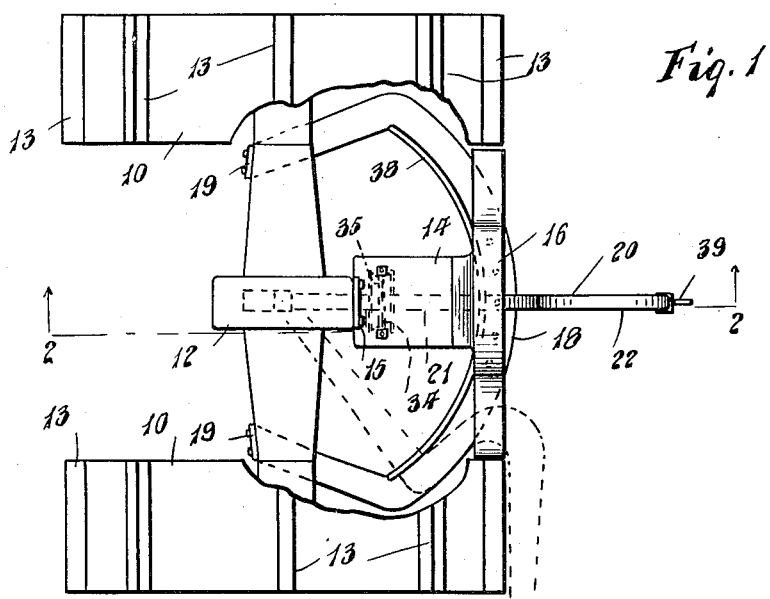
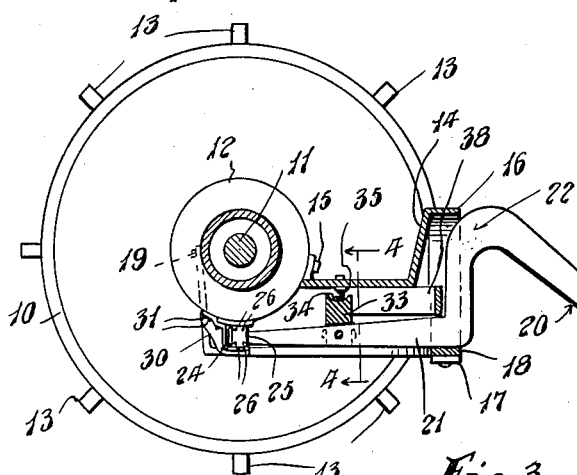
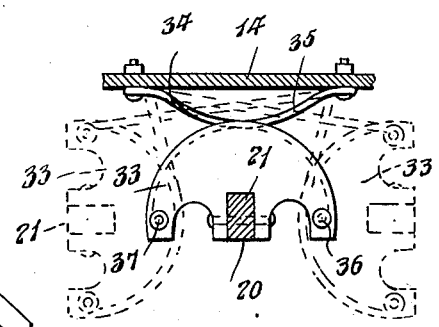
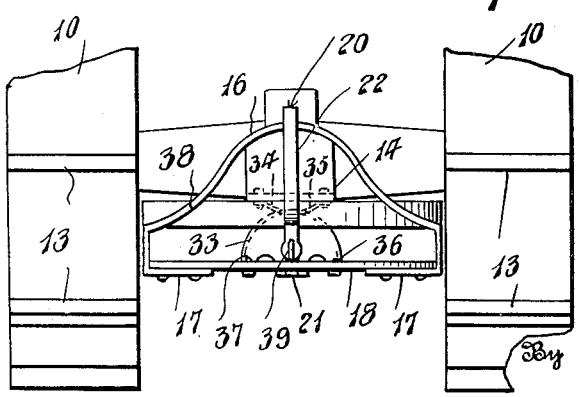
Inventor
C. A. Odegard.
Attorney Patented Aug. 1, 1933

1,920,878

UNITED STATES PATENT OFFICE 1,920,878

HITCHING DEVICE FOR TRACTORS

Clifford A. Odegard, Gonvick, Minn.

Application July 30, 1932. Serial No. 626,699

5 Claims. (Cl. 280—33.44)

This invention relates to a hitch which will enable a tractor to turn without impediment from its load, especially when the latter is heavy. With a tractor having a hitch of the conventional type, it is difficult to turn when the load is heavy and the ground is soft because the hitch is too far removed from the vertical line at the center of the rear axle where the same would be substantially neutral. It is a prime object of the present invention to provide for the turning at the central vertical line of the rear axle.

Another object is to provide a novel construction wherein the hitching member and tractor have relative movement, automatically, during turning, both laterally and on the longitudinal axis of the hitch, the latter having a deflected portion, so as to coact with the rear wheels, below the axis thereof, to shorten the turning radius of the tractor.

The more specific objects and advantages will become apparent from a consideration of the description following taken in connection with accompanying drawing illustrating an operative embodiment.

In said drawing:—

Figure 1 is a plan view showing the invention applied to the rear portion of a tractor., Figure 2 is a substantially central longitudinal vertical sectional view taken on the line 2—2 of Figure 1, Figure 3 is an end elevation, partly broken away, looking from the right of Figure 1, Figure 4 is a vertical section view taken substantially on the line 4—4 of Figure 2, Figure 5 is a detail view partly in section showing the connection of the hitching member to the axle housing, and Figure 6 is a vertical sectional view taken on the line 6—6 of Figure 5.

Referring specifically to the drawing, 10 designates the rear wheels of a conventional tractor, driving axle means 11 therefor, being contained within a fixed housing 12 as usual. At 13, the usual traction lugs are provided on the wheels 10.

A part of the platform or frame of the tractor is shown at 14 being fastened as at 15 to the housing 12 and at the rear is preferably arch-shape as at 16 as shown in Figure 3, the lower end 17 thereof being inturned so as to mount and position an arcuate supporting bar 18, whose terminals as at 19 are secured to the housing 12.

The hitching member is shown at 20. It consists of a straight arm 21 and a crook or deflected portion 22. The arm 21 rests on the arcuate bar 18, being adapted to be moved from a central or neutral position as in Figure 1, wherein the crook 22 is vertical, to either side of that position with the hitch moving laterally on a vertical axis at the rear end and also turning on the longitudinal axis of the straight arm 21 so that the crook will be horizontal and a portion of the adjacent wheel will extend into and be accommodated in the space of the crook, to enable turning of the tractor on a much smaller radius and from an axis below the axle means 11, and which is vertical and central with respect to the wheels. In order to secure the arm 21 for said movements, such arm has a reduced journal portion 23 and a head 24 forwardly thereof. Such journal 23 is journaled in a bearing block 25 consisting of sections riveted together as at 26 and providing lugs 27 and 28, at the bottom and top thereof respectively. The lug 27 is journaled in a socket 29 in a bracket 30, detachably screwed or otherwise fastened as at 31 to the housing 12. The lug 28 engages a socket 32 suitably provided in the housing.

Rigid with the arm 21 is a segmental pulley 33 which is peripherally grooved as shown, and has cables 34 and 35 secured to opposite ends thereof as at 36 and 37, respectively.

As a result, when the tractor advances in a straight line, the hitching member has the crook 22 vertical as in Figures 1 and 2. Should the tractor turn to either direction, it will move with respect to the load connected to the hitch on the vertical axis passing through the lug 27 and 28 and thus centrally of the rear axle and below the same. Such movement of the tractor continuing, according to the direction of movement, one of the cables 34 and 35 will be drawn taut, thus rotating the pulley 33 ninety degrees to either of the positions shown in dotted lines in Figure 4, thereby not only moving the hitching member on the vertical axis mentioned, but also turning said hitching member on the longitudinal axis of the arm 21 and into a position as suggested by the dotted lines in Figure 1 where the wheel may extend into the crook, enabling a much shorter turning radius.

In order to avoid undue vertical movement of the hitching member 20 and also guide the movement thereof, an arcuate bar 38 is disposed over the straight arm 21, being secured to the platform 14 or adjacent structure.

The hitching may be accomplished in any desired manner but to facilitate the same, an eyelet 39 is provided on the hitching member in line with the arm 21, the angle of turning being much greater than would be the case if the hitching member were straight.

Various changes may be resorted to provided they fall within the spirit and scope of the invention.

I claim as my invention:—

1. In combination with a vehicle, a hitching device pivotally connected thereto on a substantially vertical axis between wheels thereof, said hitching device having a crook, whereby a portion of a wheel may extend into the same during turning, and means operable to move the crook from a vertical position to a substantially horizontal position wherein it receives the wheel.

2. In combination with a vehicle, a hitching device pivotally connected thereto on a substantially vertical axis between wheels thereof, said hitching device having a crook, whereby a portion of a wheel may extend into the same during turning, and means operable to move the crook from a vertical position to a substantially horizontal position wherein it receives the wheel through the turning movement of the vehicle.

3. In combination with a vehicle, a hitching device pivotally connected thereto on a substantially vertical axis between wheels thereof, said hitching device having a crook, whereby a portion of a wheel may extend into the same during turning, and means operable to move the crook from a vertical position to a substantially horizontal position wherein it receives the wheel through the turning movement of the vehicle consisting of a pulley on the hitching device, means connected to the pulley and to the vehicle operable to turn the hitching device and thereby position the crook for reception of the wheel.

4. In combination with a vehicle, a hitching device pivotally connected thereto on a substantially vertical axis between wheels thereof, said hitching device having a crook, whereby a portion of a wheel may extend into the same during turning, means operable to move the crook from a vertical position to a substantially horizontal position wherein it receives the wheel through the turning movement of the vehicle consisting of a pulley on the hitching device, means connected to the pulley and to the vehicle operable to turn the hitching device and thereby position the crook for reception of the wheel, a supporting bar on which the hitching device is adapted to move, and means above the hitching device to prevent undue vertical movement thereof.

5. In combination with a vehicle, a hitching device pivotally connected thereto on a substantially vertical axis between wheels thereof, said hitching device having a crook, whereby a portion of a wheel may extend into the same during turning, and means operable to move the crook from a vertical position to a substantially horizontal position wherein it receives the wheel through the turning movement of the vehicle, said hitching device having a relatively straight arm, means for connecting said arm to the vehicle for movement on axes at substantially a right angle to each other for the purpose specified.

CLIFFORD A. ODEGARD.